United States Patent [19]

Higuchi et al.

[11] Patent Number: 4,891,274

[45] Date of Patent: Jan. 2, 1990

[54] HOT-DIP ALUMINUM COATED STEEL SHEET HAVING EXCELLENT CORROSION RESISTANCE AND HEAT RESISTANCE

[75] Inventors: Seijun Higuchi; Kenichi Asakawa; Takayuki Ohmori; Koji Umeno; Nobuyoshi Okada; Minoru Fujinaga; Fumio Yamamoto, all of Kitakyushu; Katsuhiko Yabe, Sagamihara, all of Japan

[73] Assignee: Nippon Steel Corporation, Tokyo, Japan

[21] Appl. No.: 927,708

[22] Filed: Nov. 7, 1986

[30] Foreign Application Priority Data

Feb. 13, 1986 [JP] Japan ................................. 61-27884

[51] Int. Cl.$^4$ ............................................. B32B 15/18
[52] U.S. Cl. ..................................... 428/653; 420/34; 420/64; 420/104; 420/120; 428/652; 428/679; 428/682; 428/684
[58] Field of Search ............... 428/652, 653, 679, 682, 428/684; 420/64, 70, 120, 121, 125, 126, 127, 34, 104

[56] References Cited

U.S. PATENT DOCUMENTS 4,054,448 10/1977 Wright ................................. 420/104

FOREIGN PATENT DOCUMENTS

13058 1/1985 Japan ..................................... 428/653

Primary Examiner—Robert McDowell
Attorney, Agent, or Firm—Wenderoth, Lind & Ponack

[57] ABSTRACT

A hot-dip aluminium coated steel sheet having excellent corrosion resistance and heat resistance, comprising a steel substrate containing 3 to 18% chromium, not more than 0.02% carbon, 0.1 to 1.5% manganese, 0.005 to 0.08% aluminium, not more than 0.1% silicon, with the balance being iron and unavoidable impurities, and aluminium coating on said sheet substrate. The coated sheet may further comprises a coating layer of nickel or nickel-iron alloy (Ni: 1 to 99%) beneath the aluminium coating, or an Al-Fe-Si-Ni-Cr alloy coating layer of 1 to 10$\mu$ in thickness and containing 0.05 to 5% nickel, 0.2 to 10% chromium, beneath the aluminium coating.

11 Claims, 8 Drawing Sheets

CORROSION WEIGHT LOSS: BY IMMERSION TEST

CORROSION WEIGHT LOSS: BY IMMERSION TEST

FIG.4

CORROSION WEIGHT LOSS: BY IMMERSION TEST

HOT-DIP ALUMINUM COATED STEEL SHEET HAVING EXCELLENT CORROSION RESISTANCE AND HEAT RESISTANCE

BACKGROUND OF THE INVENTION

1. Field of the Invention

The present invention relates to hot-dip aluminum coated steel sheets and strips (hereinafter called sheet or sheets) having very excellent corrosion resistance as well as excellent heat resistance.

Prior to the present time, hot-dip aluminum coated steel sheets, for their general excellent corrosion resistance and heat resistance, have been finding applications mainly in automobile gas exhaust systems and various types of heating equipment. However, in recent years, due to introduction of newly developed exhaust gas purifying systems and improvements of engine heat coefficient, hot-dip aluminium coated steel sheet materials, conventionally used in the automobile gas exhaust systems, have been confronted with new problems such as severe corrosion as being experienced in exhaust gas mufflers, which is caused by changes in the composition and temperature of the exhaust gas to which the materials are exposed. In efforts to overcome the problems, particularly for the purpose of enhancing the corrosion resistance of the mufflers, stainless steel sheet materials have been increasingly used for the mufflers. The stainless steel mufflers, on the other hand, have a defect in that they cannot provide satisfactory protection on the outer portion of the mufflers from the corrosion caused by calcium chloride and sodium chloride contained in snow-melting agents sprayed on highways during the winter season.

Thus, up to now, both the conventional hot-dip aluminum coated steel sheets and stainless steel sheets have been found to be unsatisfactory due to their respective in that the former does not provide enough protection to the inside of the mufflers against the corrosion by the condensate liquid of the exhaust gas, and the stainless steel mufflers are susceptible to the outside corrosion.

For improving the corrosion resistance of the hot-dip aluminum coated steel sheet materials, the conventional practice is to apply a chromate treatment after the aluminum coating, or to increase the thickness of the aluminum coating itself. In the chromate treatment, when applied to the automobile mufflers, where the materials are subjected to 300° to 400° C., the chromate film considerably loses the corrosion resistance, and on the other hand the increased thickness of the aluminum coating very often causes the peeling-off of the coatings during the forming of the mufflers.

SUMMARY OF THE INVENTION

One object of the present invention is to provide a hot-dip aluminum coated steel sheet materials having excellent corrosion and heat resistance, which are free from the above problems of the conventional materials, and, particularly when used for automobile mufflers, give excellent protection to the inner and outer surfaces of the mufflers against corrosion.

According to the present invention, chromium-containing steel sheets are used as a substrate and aluminum is coated in a conventional Al-Si (Si: 3 to 13%) hot-dip coating bath according to Sendzimir process or a non-oxidizing furnace process. Preferably, a nickel or nickel alloy coating is applied to the substrate prior to the aluminum coating so as to prevent ocurrence of non-coated portions (bare spots) and pin-holes, and to form an Al-Fe-Si-Ni-Cr alloy layer on the substrate surface for further improvement of the corrosion resistance and coating adhesion.

It is conventionally known to use a chromium-containing steel sheet as a substrate for hot-dip aluminum coating so as to improve the corrosion resistance etc., as disclosed in Japanese Laid-Open Patent Application Nos. Sho 52-33579, and Japanese Laid-Open Patent Application Nos. Sho 56-102556, Sho 60-13058, Sho 60-13057, Sho 60-13059 and so on.

However, it has been found that in the above prior arts, when the chromium content in the substrate exceeds 3%, the desired properties of resultant aluminum coated steel sheets cannot be obtained by the ordinary hot-dip aluminum coating conditions, which very often lead to occurrence of non-coated portions and pin-holes.

The present inventors have conducted extensive studies and experiments for investigating various effects of individual elements in the chromium-containing steel on the aluminum coatings, and found that the silicon content in the steel material, in particular, markedly lowers the coating properties and that addition of manganese, on the other hand, will improve the coating properties. Thus, the present invention is based partly on the discovery of the steel substrate composition suitable for the aluminum coating. Further, the present invention is partly based on the discovery of a proper thickness and composition of the alloy layer, for improving the corrosion resistance of the resultant aluminum coated steel sheets and proper pre-treatments for improving the coating properties, as well as proper coating methods for coated surface properties.

When a steel substrate containing a substantial amount of hardly reducible elements, such as chromium, silicon and aluminum, is subjected to hot-dip aluminum coating according to the Sendzimir process or non-oxidizing furnace process, these elements also are oxidized when the substrate surface is oxidized during the coating process in the oxidizing furnace or non-oxidizing furnace and in the subsequent reducing furnace. These oxidized elements, as oxides of chromium, silicon and aluminum, cannot be reduced while the oxidized iron is easily reduced, and these non-reduced oxides remain on the surface of the substrate to prohibit the reaction between the substrate iron and the coating bath when the substrate is immersed in the hot-dip aluminum coating bath, hence causing non-coated portions and pin-holes. On the other hand, from the point of the corrosion resistance of the resultant aluminum coated steel sheet materials, a larger addition of chromium in the substrate can give higher corrosion resistance, and for this purpose a larger addition of chromium is more preferable, and 3% or more chromium content in the substrate is preferable.

Therefore, other aspects of the present invention are to provide proper substrate steel compositions which can improve the coating properties of hot-dip aluminum coated steel sheets and prevent the non-coated portions and pin-holes, and to provide alloy layer compositions and pre-treatments which contribute to improve the corrosion resistance and heat resistance of the resultant aluminum coated steel sheets.

DETAILED DESCRIPTION OF THE INVENTION

The present invention will be described in more details referring to the accompanying drawings.

In order to assure that a hot-dip aluminum coated steel sheet can fully exhibit desired properties, such as corrosion resistance and heat resistance, it is essential that the resultant aluminum coated steel sheet be completely free from non-coated portions (bare spots) and pin-holes and other coating defects. This resultant coating quality is affected by the composition of the substrate steel sheets. Therefore, the development work has been conducted from the following two points: (1) development of substrate steel compositions which can provide excellent aluminum coating quality, and (2) improvement of hot-dip aluminum coatability on hardly coatable substrates.

The basic substrate steel composition according to the present invention contains:
  Carbon: not more than 0.02%
  Manganese: 0.1 to 1.5%
  Aluminium: 0.005 to 0.08%
  Silicon: not more than 0.1%
  Chromium: 3 to 18%
  Balance: iron and unavoidable impurities The above basic steel composition may contain at least one of titanium, vanadium, and zirconium in an amount ranging from 0.03 to 0.16% and/or 0.0005 to 0.003% boron.

Reasons for defining the individual elements as above in the substrate steel composition to be used in the present invention will be explained hereinbelow.

Carbon in the substrate steel composition tends to lower the coating quality and deteriorate both the corrosion resistance and the heat resistance. For this reason, the carbon content is maintained at not more than 0.02% in the present invention.

Figure 2:
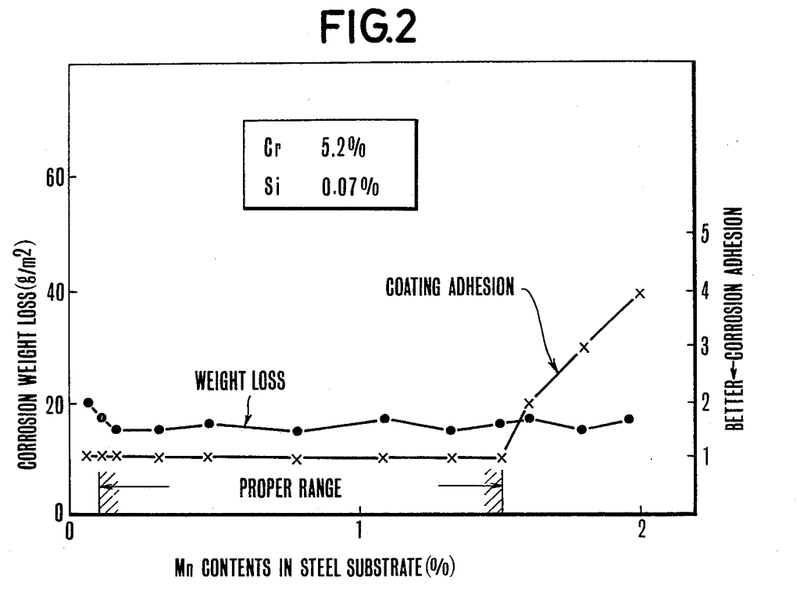
FIG. 2 is a graph showing effects of various manganese contents in the substrates on the solution immersion test results and the coating adhesion.

Manganese contributes to improve the wettability of the substrate in the aluminum coating bath, and promote uniform reaction over the whole surface of the substrate, thus preventing occurrence of microscopic non-coated portions and improving the corrosion resistance and the heat resistance of resultant aluminum coated steel sheets. However, manganese contents more than 1.5% will damage the coating adhesion as shown in FIG. 2 and cause the peeling-off of the coating during the forming process. Therefore, the manganese content is maintained not more than 1.5% in the present invention.

On the other hand, the lower limit of the manganese content is set at 0.1%, because it is economically disadvantageous to maintain the manganese content at amounts lower than 0.1% in the ordinary steel making process, and no substantial improvement of corrosion resistance and heat resistance can be expected.

Figure 1:
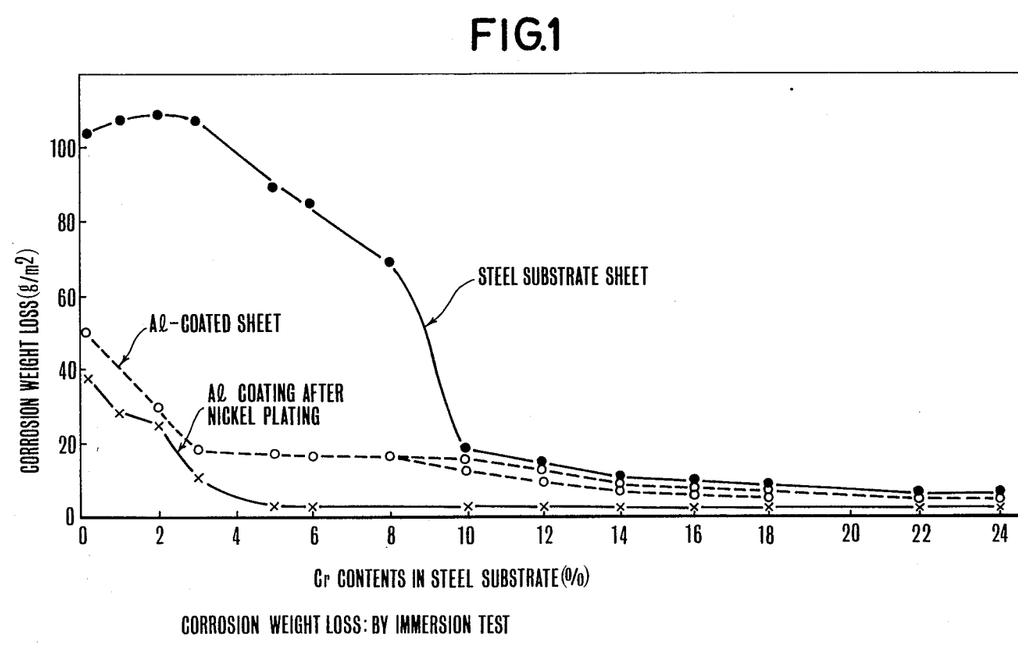
FIG. 1 is a graph showing the relation between various chromium contents in the substrates and the weight loss by corrosion in solution immersion tests of a substrate steel sheet without coating, a hot-dip aluminum coated steel sheet and a nickel-pre-coated then aluminum-coated steel sheet.

Chromium is added to the substrate steel composition for the purpose of improving the corrosion resistance of the resultant aluminum coated steel sheets. In FIG. 1, the results of investigations on the relation between the corrosion weight loss in corrosion tests and the chromium contents in the substrate, are conducted using non-coated steel sheets and aluminum coated steel sheets. The results show that remarkably improved corrosion resistance can be obtained by aluminum coated steel sheets as compared with the corrosion resistance obtained by the non-coated steel sheets. The tendency is particularly distinct when the chromium content in the substrate is 3% or more. So far as the corrosion resistance of the substrate steel sheet itself is concerned, as the chromium content increases, the corrosion resistance increases, and the improvement is remarkable when the chromium content is more than 10%. However when the chromium content in the substrate exceeds 18%, the contribution of the aluminum coating itself to the improvement of corrosion resistance of the aluminum coated steel sheet as a whole is relatively very small, thus assuring no practical advantage. Therefore from the point of improving the corrosion resistance by the aluminum coating itself, 3 to 18% chromium in the substrate is preferable.

Figure 3:
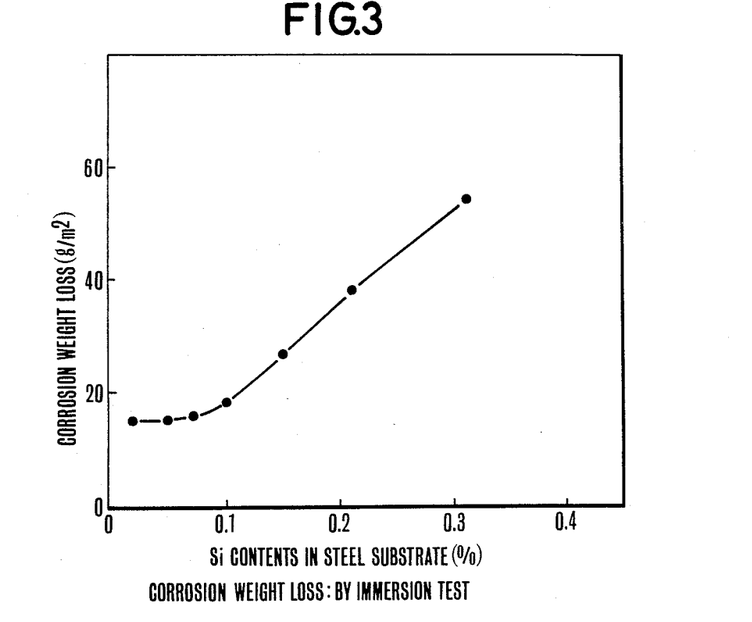
FIG. 3 is a graph showing effects of various silicon contents in the substrates on the corrosion weight loss in solution immersion tests.

Silicon contents more than 0.1% in the substrate will cause disadvantages such that the wettability and reactivity of the substrate in the aluminum coating bath is damaged by silicon oxides or Fe-Si oxides formed on the substrate surface during the oxidation-reduction process so that the non-coated portion is so much increased and the corrosion resistance is lowered as shown in FIG. 3. Therefore the silicon content is maintained in amounts not more than 0.1% in the present invention.

Aluminium is used for deoxidation of the steel during the steel making and comes into the substrate. However, aluminum contents less than 0.005% in the form of acid soluble Al in the substrate will more likely cause surface defects of the substrate, but on the other hand if the aluminum content in the form of acid soluble Al exceeds 0.08%, the aluminum coatability of the substrate is lowered, causing non-coated portions. Therefore the aluminum content in the form of acid soluble Al is maintained in amounts ranging from 0.005 to 0.08% in the substrate.

Phosphorus and sulfur respectively tend to lower the workability and corrosion resistance of the substrate and should be maintained as low as possible. Phosphorus contents not more than 0.03% and sulfur contents not more than 0.02% may be safely present in the substrate in the present invention.

Figure 4:
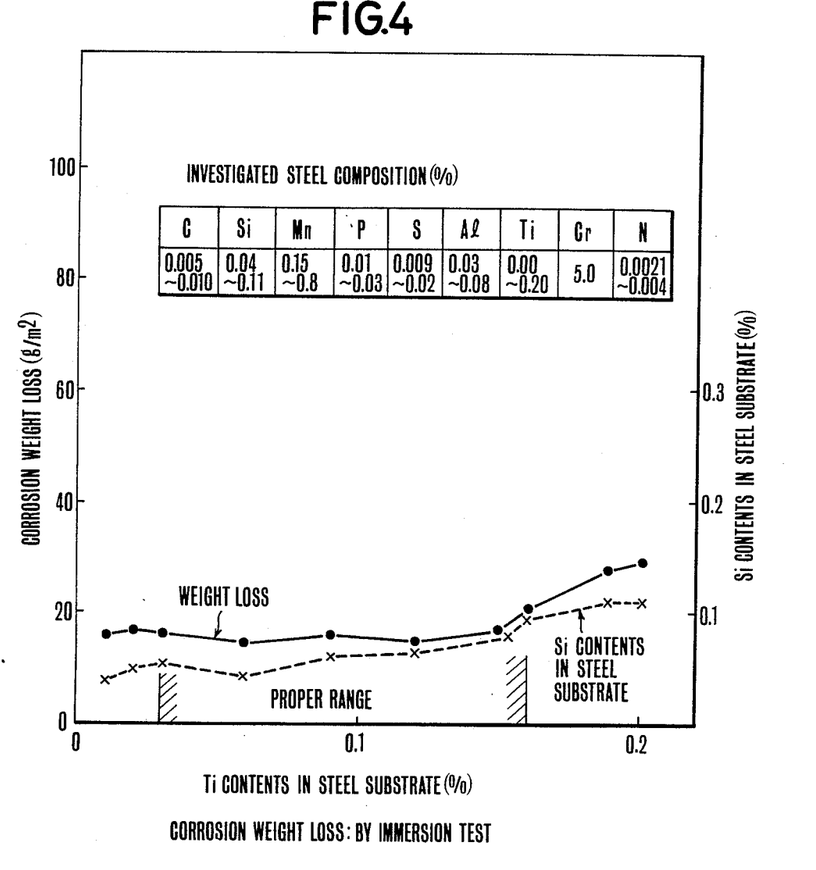
FIG. 4 is a graph showing effects of various titanium contents in the substrates on the corrosion weight loss in solution immersion tests, and the silicon contents changing depending on the titanium contents.
Figure 5:
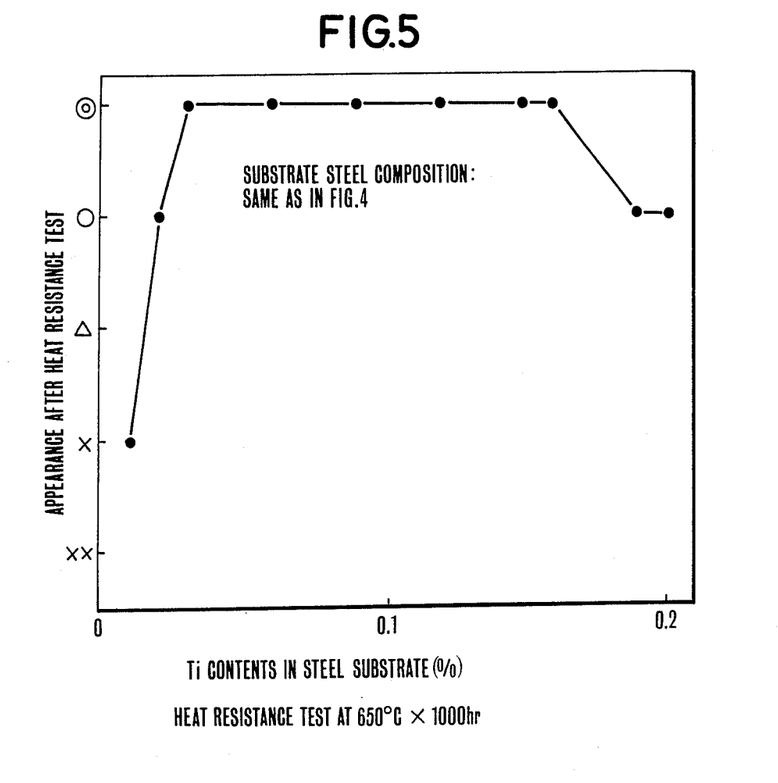
FIG. 5 is a graph showing effects of various titanium contents in the substrates on the heat resistance.

In addition to the above basic elements, titanium addition to the substrate is effective and advantageous where oxidation resistance at high temperatures and workability as well as corrosion resistance of the aluminum coated steel sheet are a predominant preference. Titanium functions to fix carbon and nitrogen in the steel to provide good workability to the steel and to prevent carburization and nitrization of chromium added as a corrosion resistance improver in the steel; it is thus effective to maintain the desired corrosing resistance as shown in FIG. 4. Further when the aluminum coated steel sheet is used as a heat resistance material and heated to high temperatures, the aluminum coating layer diffuses into the substrate matrix containing titanium to form a film having excellent oxidation resistance, hence greatly enhancing the heat resistance as shown in FIG. 5. For assuring the above effects, not less than 0.03% titanium is required to be present in the substrate. Further, higher titanium contents in the substrate will be advantageous from the point of heat resistance, because the diffusion of the aluminum coating layer into the substrate is more quickly promoted by titanium when heated at high temperatures. However, when present in amounts more than 0.16%, titanium acts as a reducing agent during the steel melting to cause introduction of silicon into the steel melt from the slag and furnace refractories, which causes, during the aluminum coating, non-coating and pin-holes, which in turn will lower the corrosion resistance and heat resistance of the aluminum coated steel sheet. Therefore, in the present invention, the titanium content is limited to amounts ranging from 0.03 to 0.16% as an effective range for remarkably improving the heat resistance without damaging the corrosion resistance.

Zirconium and vanadium, which produce similar effects as titanium, may be added respectively, alone or in combination or in substitution of titanium, in amounts defined above to obtain similar desired results as titanium.

Figure 6:
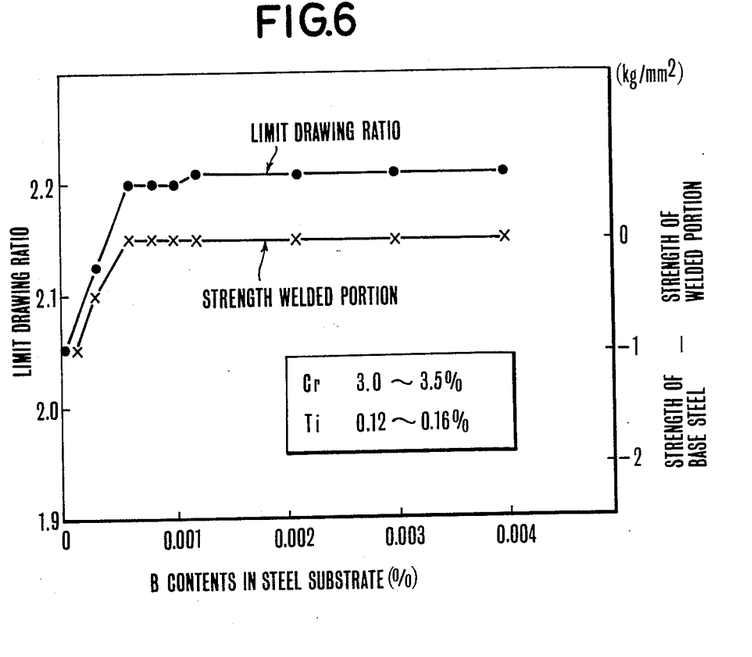
FIG. 6 is a graph showing effects of various boron contents in the substrates on the limits of reduction of area and the strength of welded portions by MIG welding.

When the resultant aluminum coated steel sheet material is used in applications where multi-step drawing or welding, such as TIG and MIG welding, is performed, addition of boron in the substrate is advantageous. The boron addition will prevent the undesired grain growth during the recrystallization of a chromium-containing steel and enhance the grain boundary strength by precipitation thereto to prevent secondary cracking of the steel; hence improving the workability of the steel. Further, the boron addition will prevent the lowering of strength of the steel due to coarsening of grains caused by heat effects of welding. For these purposes, more than 0.0005% boron is required as shown in FIG. 6, but the effects of the boron addition will saturate when boron is present in amounts more than 0.003%, and the hot strength of the steel becomes too high; thus lowering the hot workability. Therefore the boron content ranging from 0.0005 to 0.003% is preferable in the present invention.

As explained above, the component elements of the chromium containing steel substrate can be adjusted so as to enable satisfactory hot-dip aluminum coating on the substrate to obtain high corrosion resistance aluminum coated steel sheet materials. However, for performing the hot-dip aluminum coating, it is necessary to maintain $O_2$ and $H_2O$ in the furnace reducing atmosphere as low as possible, and it has been found that satisfactory aluminum coating cannot be easily obtained if $O_2$ is more than 1 ppm and D.P is higher than $-40°$ C. In a practical coating line, the $O_2$ content and D.P may often vary substantially, and if the $O_2$ content exceeds 1 ppm and D.P is higher than $-40°$ C., the coating surface will be oxidized to damage the wettability, resulting in coating defects and damaging the surface appearance after the aluminum coating, thereby deteriorating the heat resistance and corrosion resistance.

Figure 7:
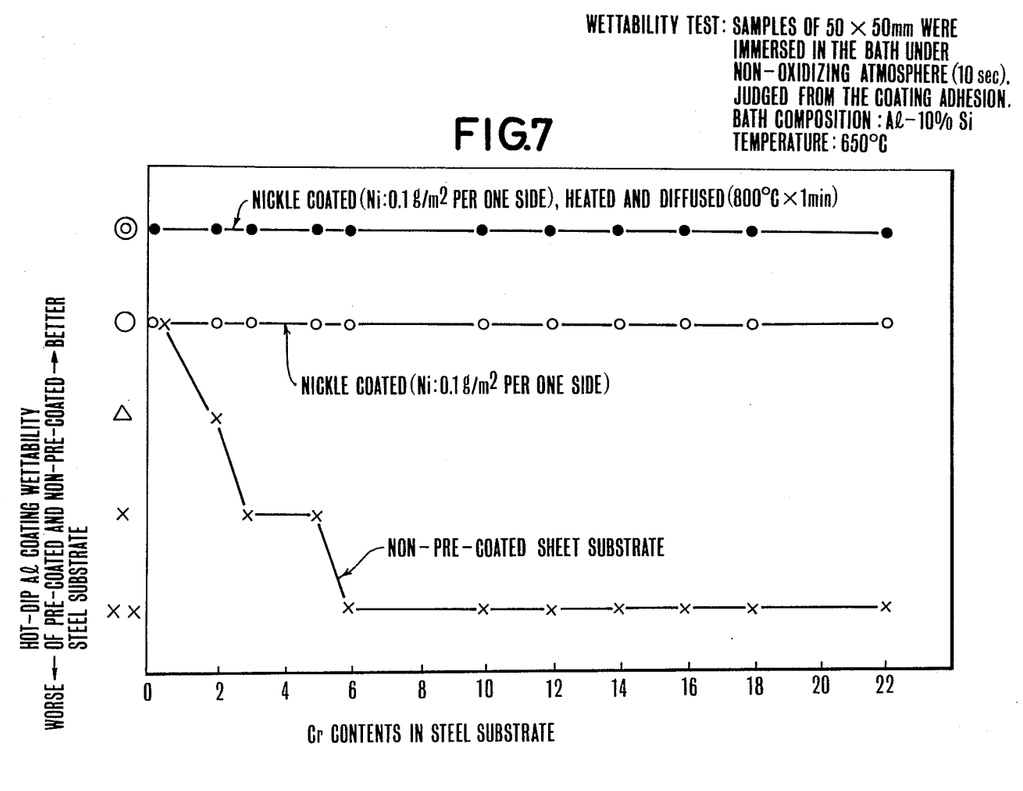
FIG. 7 is a graph showing effects of various chromium contents in the substrates on the wettability of the substrates with the molten aluminum bath containing 10% silicon at 650° C. The test pieces are a substrate steel sheet without coating, a nickel coated sheet (Ni coating: 0.1 g/m² per one side), and a nickel coated steel sheet which was obtained by nickel coating and then diffusion treatment by heating.

According to a modification of the present invention suited and preferable for applying hot-dip aluminum coating on hard-to-coat materials, such as chromium containing steels, comprises applying a nickel or nickel-alloy coating on the surface of a conventionally cold rolled steel sheet after surface cleaning. The substrate pre-coated with nickel or nickel alloys is effective to prevent the oxidation of the chromium in the surface layer of the sheet substrate during the reducing-oxidizing annealing process and has improved wettability with the Al coating as shown in FIG. 7 in connection with the example of a substrate precoated with nickel.

Figure 8:
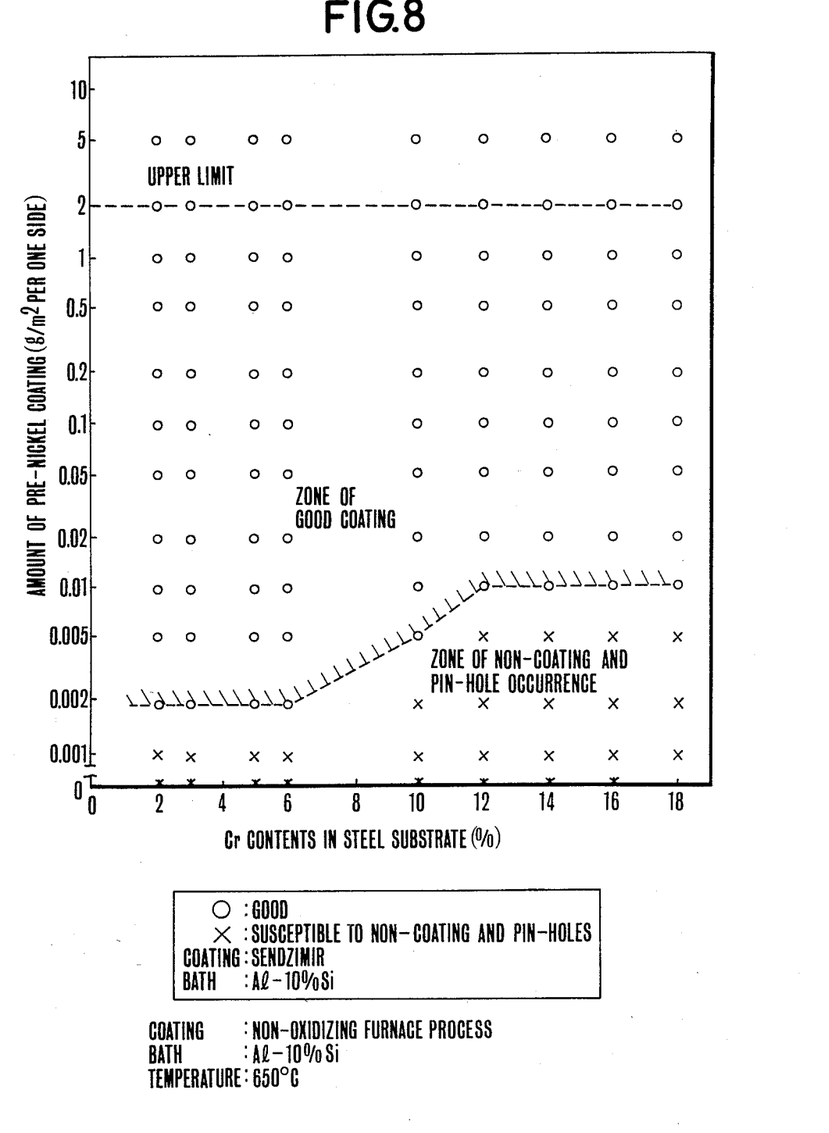
FIG. 8 is a graph showing effects of the amounts of the pre-nickel coating on the aluminum coatability on substrates containing various amounts of chromium.

The amount of nickel coating required for improving the quality of the aluminum coating to be obtained is, as shown in FIG. 8, at least 0.002 g/m² (per one side) when the chromium content in the substrate is less than 6%. The amount of nickel coating must be increased within the range from 0.002 to 0.01 g/m² as the chromium content in the substrate increases within the range of 6 to 12%, and more than 0.01 g/m² of nickel coating is required when the chromium content in the substrate is 12% or more. On the other hand, there is no specific upper limit for the nickel coating from the point of the coating quality to be obtained, but the effect of the nickel coating will saturate at about 2 g/m² or more. Therefore, the excessive nickel coating is not recommendable from the economical point of view and is of no technical significance.

It has been also observed, as shown in FIG. 1, the corrosion resistance of the Al coated sheet is markedly improved when the substrate sheet is coated with nickel, oxidized and reduced according to the ordinary non-oxidizing furnace system, and then coated with aluminum by hot dipping.

Further, it has been found that the same effects as the nickel coating can be obtained by the coating of nickel alloys, typically, Ni-Fe (Ni 1 to 99%) and Ni-Co (Co 0.1 to 30%) as shown in Table 1 below.

TABLE 1

| Nickel Alloy | Alloy Composition (%) | | Coatability* (non-coating) | Coating** Adhesion | Corrosion Resistance (weight loss) |
|---|---|---|---|---|---|
| Ni—Fe | Ni | 99 | ○ | ○ | 3.5 g/m² |
|  |  | 50 | ○ | ○ | 2.7 |
|  |  | 30 | ○ | ○ | 3.0 |
|  |  | 5 | ○ | ○ | 3.2 |
|  |  | 1 | ○ | ○ | 2.5 |
| Ni—Co | Co | 0.1 | ○ | ○ | 2.9 |

TABLE 1-continued

|  |  |  |  |
|---|---|---|---|
| 1 | ○ | ○ | 3.5 |
| 10 | ○ | ○ | 3.0 |
| 30 | ○ | ○ | 4.0 |

| | |
|---|---|
| Substrate: | 11.8% Cr steel |
| Amount of Nickel Alloy Coating: | 0.5 g/m² per one side |
| Coating Method: | Non-oxidizing furnace process |
| Coating Bath: | Al—10% Si |
| Amount of Al Coating: | 80 g/m² |

*Coatability: Immersion in 30% NaOH solution at 80° C. to judge occurrence of non-coating on coating peel-off surface
○ good
Δ: slightly non-coated
X: largely non-coated
**Coating Adhesion: Press testing to judge coating peel-off.
◯ no peel-off
XX: peel-off over whole surface As understood from the foregoing, the precoating of nickel or nickel alloys applied to the substrate sheet will improve the wettability with aluminum coating and the quality of the aluminum coating obtained by hot dipping. These improvements are attributed to the facts that the reaction between the surface of the pre-coated substrate to be aluminum coated and the aluminum coating bath is proceeded more uniformly so that a uniform alloy layer is formed on the pre-coated surface of the substrate, and various properties including corrosion resistance and heat resistance are remarkably improved.

In recent years, the hot-dip aluminum coated sheets have been increasingly used in various media under more severe conditions, such as very corrosive media containing a large amount of NH$_4$ ions for example, where the dissolution rate of the aluminum coating is much accelerated. For these reasons, strong demands have been made for aluminum coated sheets which have improved corrosion resistance of the alloy layer in these severe conditions and can enjoy an elongated service life.

It has been found by the present inventors that as compared with the Al-Si-Fe alloy layer normally formed in the Al-Si coating bath, the Al-Si-Fe-Ni-Cr alloy layer containing 0.05 to 5% nickel and 0.2 to 10% of chromium gives better corrosion resistance as shown in Table 2.

TABLE 2

| Ni Contents in Alloy Layer | Cr Contents in Alloy Layer | | | | | | |
|---|---|---|---|---|---|---|---|
| | 0 | 0.1 | 0.2 | 0.5 | 3 | 10 | 12 |
| 0 | X | Δ | X | Δ | ⊚ | ⊚ | ⊚ |
| 0.01 | X | X~Δ | Δ | ○ | ⊚ | ⊚ | ⊚ |
| 0.05 | Δ | ○ | ⊚ | ⊚ | ⊚ | ⊚ | ⊚ |
| 0.1 | ○ | ○ | ⊚ | ⊚ | ⊚ | ⊚ | ⊚ |
| 0.5 | ○ | ⊚ | ⊚ | ⊚ | ⊚ | ⊚ | ⊚ |
| 1 | ⊚ | ⊚ | ⊚ | ⊚ | ⊚ | ⊚ | ⊚ |
| 2 | ⊚ | ⊚ | ⊚ | ⊚ | ⊚ | ⊚ | ⊚ |
| 5 | ⊚ | ⊚ | ⊚ | ⊚ | ⊚ | ⊚ | ⊚ |
| 10 | ⊚ | ⊚ | ⊚ | ⊚ | ⊚ | ⊚ | ⊚ |
| 30 | ⊚ | ⊚ | ⊚ | ⊚ | ⊚ | ⊚ | ⊚ |
| 50 | ⊚ | ⊚ | ⊚ | ⊚ | ⊚ | ⊚ | ⊚ |

In this connection, it has been also found that the improved corrosion resistance of the above alloy layer containing nickel and chromium, in combination with the effects of the hot-dip aluminum coating, can prevent the pitting corrosion caused from the worked edge surfaces of the sheets. However, it has been observed that the improving effect of the alloy layer will saturate when the chromium content in the alloy layer exceeds 10% and the nickel content in the layer exceeds 5%, and adversely, the alloy layer will have electrochemically a nobler potential than the substrate itself, and tends to promote the pitting corrosion of the substrate.

When the nickel content in the alloy layer is less than 0.05% and the chromium content is less than 0.2%, no definite improvement of the corrosion resistance can be obtained, and for this reason, at least 0.05% of nickel and at least 0.2% of chromium must be contained in the alloy layer.

Therefore, in the present invention, the nickel and chromium contents in the alloy-layer of Al-Si-Fe-Ni-Cr are limited to the range 0.05 to 5% and the range of 0.2 to 10%, respectively.

Regarding the thickness of the alloy layer, at least 1μ or thicker is required for the purpose of obtaining a uniform hot-dip aluminum coating, by preventing occurrence of pin holes due to the local non-coating. On the other hand, if the thickness exceeds 10μ, there are caused various problems, such as coating peeling-off or cracking of the coating layer during the mechanical working including press forming, because the alloy layer is inherently hard and brittle. Therefore, in the present invention the thickness of the alloy layer is limited to the range of 1 to 10μ.

The Al-Si-Fe-Ni-Cr alloy layer has been found to have very excellent corrosion resistance to the condensate liquid of exhaust gases, in particular, and thus the exhaust gas pipe may have a thinner alloy layer on the outer side and a thicker alloy layer on the inner wall to be exposed to the exhaust gas. When the exhaust gas condensate liquid contains halogen ions, such as Cl-ions, the aluminum coating is severely attacked. It has been discovered by the present inventors that the Al-Si-Fe-Ni-Cr alloy layer as defined in the present invention provides excellent corrosion resistance to the exhaust gas or the exhaust gas condensate liquid containing halogen ions.

The alloy layer of the metal coating on the inner wall of mufflers should be thicker, preferably 6μ or more, to enhance the corrosion resistance to the exhaust gas or exhaust gas condensate liquid. On the other hand, however, an excessive thickness of the alloy layer tends to cause the peeling-off of the coating during mechanical working so that it is necessary to maintain the thickness of the alloy layer not more than 10μ.

Regarding the alloy layer on the outer surface of the mufflers, as the aluminum coating is superior from the aspect of the corrosion resistance in the ambient atmosphere, the alloy layer should preferably be not more than 6μ.

If the alloy layer is excessively thick, the thickness of the aluminum layer is relatively reduced (if the coating amount is constant) and the dissolution rate of the aluminum layer increases in the defective portions of the aluminum coating due to the sacrificial protection phenomenon of the aluminum coating with respect to the alloy layer and the steel substrate so that the corrosion resistance will be deteriorated. The control of the thickness of the alloy layers on both surfaces of an aluminum coated steel sheet to the above different thicknesses can be performed by regulating the amount of the pre-coating of nickel or nickel alloys, thus applying a larger amount of the pre-coating on the surface on which a thicker alloy layer is to be formed and a smaller amount of the pre-coating on the surface on which a thinner alloy layer is to be formed.

The alloy layer containing Ni and Cr as above, when heated at high temperatures, promotes the diffusion reaction with the aluminum coating layer, and during actual service at high temperatures, can easily form a highly corrosion resistant alloy layer mainly composed of Al and Fe up to the coating surface.

In conventional similar metal coated steel material, when the material is heated, the coating is cracked due to the difference in thermal expansion of the metal coating layer, the intermediate alloy layer and the substrate steel, and the substrate steel is oxidized at the cracked portions.

In the present invention the above problem is very rare, because the diffusion reaction is very rapid.

Further, a Ni-Fe-Cr diffusion layer containing not more than 50% of nickel and having a thickness not more than $2\mu$ may be formed as a pre-coating below the Al-Si-Fe-Ni-Cr alloy layer. With the above diffusion layer on the substrate steel surface, the corrosion resistance of the substrate steel itself is improved and at the same time the effect to reduce the pin-holes of the Al-Si-Fe-Ni-Cr alloy layer is further enhanced. When the nickel concentration in the Ni-Fe-Cr diffusion layer exceeds 50%, although the corrosion resistance of the diffusion layer itself is improved, the diffusion layer will become electrochemically nobler in the event of the destruction of the layer, so that the substrate steel is most likely attacked by pitting corrosion. Therefore the nickel content in the Ni-Fe-Cr diffusion layer is preferably not more than 50%. Regarding the chromium content in the diffusion layer, a preferable range is from 1 to 15%. Below 1%, chromium hardly contributes to a tangible improvement of the corrosion resistance of the diffusion layer, and on the other hand, chromium contents in excess of 15% will harden the diffusion layer and causes the cracking of the layer during the working.

Regarding the thickness of the Ni-Fe-Cr diffusion layer, if the thickness exceeds $2\mu$, the layer is more likely to crack, due to its inherent relative very high hardness, during the working, causing the damage of corrosion resistance. Therefore, it is desirable that the thickness of the Ni-Fe-Cr diffusion layer is not more than $2\mu$.

In the present invention, the formation of the Al-Si-Fe-Ni-Cr alloy layer, or Al-Si-Fe-Ni-Cr alloy layer and the pre-coating diffusion layer of Fe-Ni-Cr may be made by applying a pre-coating of nickel or nickel alloys on the chromium-containing steel substrate defined in the present invention, and then subjecting the pre-coated substrate steel to hot-dip aluminum coating by the Sendzimir process or non-oxidizing furnace process. Further, the Fe-Ni-Cr diffusion layer may be formed by the heat diffusion in an oxidizing furnace, or non-oxidizing furnace, and in a reducing furnace in the hot-dip aluminum coating line and retained by controlling the alloy layer formation reaction in the aluminum coating bath, particularly the bath temperature and the temperature of the pre-coated substrate immersed in the bath. The formation of the Al-Si-Fe-Ni-Cr alloy layer and Fe-Ni-Cr diffusion layer may be achieved by other methods. For example, an electrolytic Ni-Cr-Fe alloy coating is formed by subjecting the substrate on an cathodic electrolysis in an electrolytic bath in which Ni, Fe and Cr ions are co-present, such as in an alloy plating bath of nickel sulfate-nickel chloride-iron sulfate-chromium sulfate. The substrate coated with the Ni-Cr-Fe alloy in this way is then subjected to a reducing annealing and immersed in a hot-dip aluminum coating bath. Impurities particularly cobalt, coming from the metal sources, such as nickel source, used in the electrolytic process, are very small in amount and may be neglected in obtaining the objects of the present invention.

Further, within the scope of the present invention, the component elements of the substrate steel, such as Ti and Mn may be contained in the Fe-Ni-Cr diffusion layer or in the Al-Si-Fe-Ni-Cr alloy layer. Also the coating bath, which is normally an Al-Si bath, may contain Mn and Mg.

For improving the coatability of aluminum on a chromium containing steel which is very hard to coat on, the surface roughness of the steel substrate has been found to be a large contributing factor as well as the nickel or nickel alloy pre-coating. The present inventors have investigated the relation between the surface roughness of the steel substrate and the hot-dip aluminum coatability and have found that the coatability is greatly improved when the surface roughness of the chromium-containing steel substrate is maintained not larger than Hmax $3\mu$.

Generally, as the causes of non-coating and pin-holes often seen in hot-dip aluminum coating have been attributed to the unsatisfactory reduction cleaning of the surface of the substrate to be coated and the scum formed by the reaction between the coating bath and the furnace atmosphere, which floats up and adheres to the surface of the substrate during the immersion in the bath preventing the reaction between the substrate and the bath. Thus when the surface roughness of the substrate to be coated is excessively rough, the scum is more likely entrapped at the bath surface, and the scum once adhered to the surface in the bath is very hard to remove from the surface. These tendencies are more apparent in the chromium-containing steel substrate.

Figure 9:
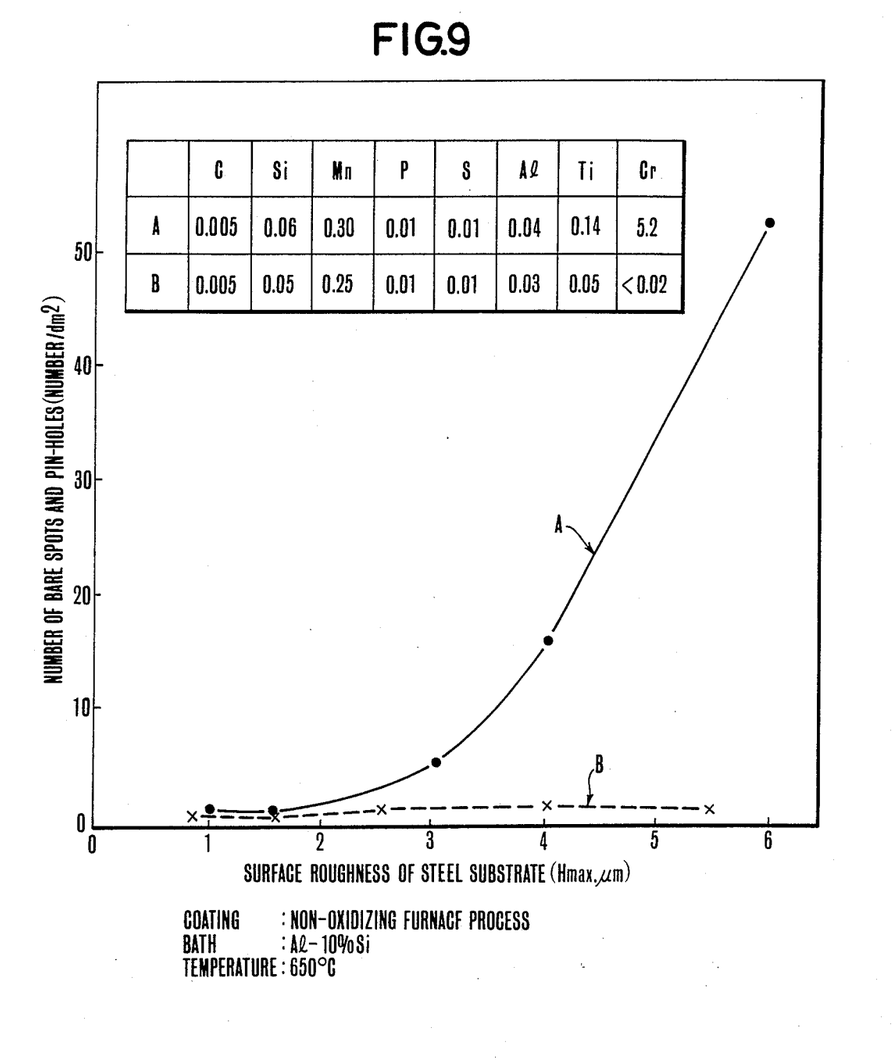
FIG. 9 is a graph showing effects of the surface roughness of the hot-dip aluminum coating on a substrate containing 5.2% chromium (the curve A) and on substrate containing no chromium (the curve B).

FIG. 9 shows the results of the investigation on the relation between the surface roughness of the substrate and the hot-dip aluminum coatability. In the case of ordinary carbon steels, the surface roughness of the substrate to be coated is negligible, producing no substantial influence on the aluminum coatability. However, in the case of chromium-containing steel, non-coating and pin-holes remarkably occur when the surface roughness exceeds Hmax $3\mu$, but on the other hand when the roughness is Hmax $3\mu$ or less, a similar coatability as good as obtainable in the ordinary carbon steels can be obtained.

For preparation of the substrate steel used in the present invention, the steel is prepared to have the desired composition in the ordinary steel making process, cast, hot-rolled, acid-pickled, and cold rolled to obtain a steel substrate to be given hot-dip aluminum coating by the Sendzimir process or non-oxidizing furnace process. During the cold rolling step, the surface roughness is adjusted to Hmax $3\mu$ or less by selecting a desired roll surface roughness.

DETAILED DESCRIPTION OF THE PREFERRED EMBODIMENTS

The present invention will be better understood from following description of preferred embodiments.

EXAMPLE 1

Steel slabs were prepared in a convertor, and continuous casting, and the slabs were hot rolled, acid-pickled, and cold rolled into 0.8mm thick sheets (reduction: 88%) having various compositions shown in Table 3.

These sheets were subjected to continuous hot-dip aluminum coating to give 80 g/m² coating. The corrosion resistance and heat resistance of the aluminum coated sheets thus obtained are shown in Table 3. As understood from the results, the aluminum coated sheets according to the present invention show less corrosion weight loss, better surface appearance, better corrosion resistance, better heat resistance, and better surface condition after heating at high temperature, as compared with the conventional comparative coated sheets.

As compared with the conventional comparative coated sheets, the aluminum coated sheets according to the present invention show less corrosion weight loss, and better appearance condition and corrosion resistance. In particular, the surface condition after the heating at high temperatures is better, indicating excellent heat resistance by virtue of the titanium addition.

TABLE 4

|  | Substrate Steel Composition (%) | | | | | | | | | Corrosion Resistance | | Coating Adhesion | Heat Registance |
|---|---|---|---|---|---|---|---|---|---|---|---|---|---|
|  | C | Si | Mn | P | S | Al | Ti | Cr | N | Weight Decrease | Appearance | | |
| Present Invention | 0.003 | 0.04 | 0.80 | 0.02 | 0.01 | 0.04 | 0.04 | 3.2 | 0.003 | 18.5 g/m² | ◎ | 1 | ◎ |
|  | 0.004 | 0.08 | 0.60 | 0.01 | 0.01 | 0.06 | 0.12 | 5.0 | 0.002 | 16.5 g/m² | ◎ | 1 | ◎ |
|  | 0.004 | 0.05 | 0.70 | 0.01 | 0.01 | 0.05 | Nb 0.16 | 6.8 | 0.002 | 16.0 g/m² | ◎ | 1 | ◎ |
|  | 0.004 | 0.05 | 1.01 | 0.01 | 0.01 | 0.05 | 0.16 | 6.8 | 0.002 | 16.8 g/m² | ◎ | 1 | ◎ |
|  | 0.005 | 0.05 | 0.65 | 0.01 | 0.01 | 0.05 | V 0.10 | 6.5 | 0.002 | 16.5 g/m² | ◎ | 1 | ◎ |
|  | 0.003 | 0.10 | 1.25 | 0.01 | 0.01 | 0.05 | 0.15 | 10.0 | 0.002 | 12.0 g/m² | ◎ | 1 | ◎ |
|  | 0.003 | 0.06 | 0.82 | 0.01 | 0.01 | 0.08 | 0.14 | 11.8 | 0.002 | 11.5 g/m² | ◎ | 1 | ◎ |
| Comparison | 0.003 | 0.04 | 0.25 | 0.01 | 0.01 | 0.04 | 0.05 | <0.01 | 0.003 | 39.8 g/m² | X | 1 | ◎ |
| (Conventional) | 0.04 | 0.05 | 0.20 | 0.01 | 0.01 | 0.06 | 0.00 | <0.01 | 0.004 | 33.7 g/m² | X | 1 | X |

EXAMPLE 2

Steel slabs were prepared in a convertor and continuous casting, and the slabs were hot rolled, acid-pickled, and cold rolled into 0.8 mm thick sheets (reduction: 88%) having various compositions shown in Table 4. These sheets were subjected to hot-dip aluminum coating in a bath of Al-10%Si to give 80 g/m² coating by the non-oxidizing process. The corrosion resistance, coating adhesion and heat resistance of the aluminum coated sheets thus obtained are shown in Table 4.

EXAMPLE 3

0.8 mm thick steel substrates having compositions shown in Table 5 were subjected a continuous hot-dip aluminum coating in the Al-10%Si bath at 650° C. to give 80 g/m² coating. The corrosion resistance, coating adhesion, heat resistance, press-formability, and strength of welded portions are shown in Table 5. As compared with the conventional comparative coated sheets, the aluminum coated sheets according to the present invention show better properties including corrosion resistance, heat resistance, and press-formability, without suffering from the lowering of strength in the weld-heat affected zone by virtue of boron addition.

TABLE 3

|  | Substrate Steel Composition (%) | | | | | | | | Corrosion* Resistance Weight Decrease (g/m²) | Appearance | Remarks |
|---|---|---|---|---|---|---|---|---|---|---|---|
|  | C | Si | Mn | P | S | Al | Cr | N | | | |
| Present Invention | 0.003 | 0.10 | 0.30 | 0.02 | 0.01 | 0.04 | 3.0 | 0.003 | 16.5 | ◎ | |
|  | 0.004 | 0.07 | 0.80 | 0.01 | 0.01 | 0.06 | 5.2 | 0.002 | 15.0 | ◎ | |
|  | 0.005 | 0.06 | 0.81 | 0.01 | 0.01 | 0.06 | 7.2 | 0.003 | 11.5 | ◎ | |
|  | 0.008 | 0.09 | 1.35 | 0.02 | 0.01 | 0.08 | 10.4 | 0.003 | 9.8 | ◎ | |
|  | 0.004 | 0.04 | 1.50 | 0.02 | 0.01 | 0.06 | 16.0 | 0.003 | 5.4 | ◎ | |
|  | 0.010 | 0.05 | 1.02 | 0.02 | 0.01 | 0.05 | 18.0 | 0.002 | 5.5 | ◎ | |
| Comparison | 0.003 | 0.04 | 0.25 | 0.01 | 0.01 | 0.04 | <0.01 | 0.003 | 39.8 | X | Ti: 0.05% |
|  | 0.04 | 0.05 | 0.20 | 0.01 | 0.01 | 0.06 | <0.01 | 0.004 | 33.7 | X | |

TABLE 5

|  |  | Substrate Steel Composition | | | | | | | | | |
|---|---|---|---|---|---|---|---|---|---|---|---|
|  |  | C | Si | Mn | P | S | Al | Ti | Cr | N | B |
|  | 1 | 0.003 | 0.10 | 0.21 | 0.02 | 0.01 | 0.04 | 0.12 | 1.0 | 0.004 | 0.0006 |
|  | 2 | 0.005 | 0.09 | 0.60 | 0.01 | 0.01 | 0.07 | 0.13 | 2.0 | 0.004 | 0.0010 |
|  | 3 | 0.004 | 0.09 | 0.44 | 0.01 | 0.01 | 0.06 | 0.12 | 3.3 | 0.004 | 0.0025 |
|  | 4 | 0.004 | 0.08 | 0.43 | 0.02 | 0.01 | 0.06 | 0.12 | 3.3 | 0.005 | 0.0030 |
|  | 5 | 0.009 | 0.08 | 0.35 | 0.02 | 0.01 | 0.05 | 0.14 | 5.2 | 0.007 | 0.0005 |
|  | 6 | 0.008 | 0.09 | 0.40 | 0.02 | 0.01 | 0.07 | 0.15 | 7.5 | 0.003 | 0.0008 |
|  | 7 | 0.007 | 0.09 | 0.33 | 0.02 | 0.01 | 0.06 | 0.14 | 9.0 | 0.006 | 0.0006 |
|  | 8 | 0.008 | 0.09 | 0.36 | 0.01 | 0.01 | 0.05 | 0.16 | 12.0 | 0.007 | 0.0010 |
| Present | 9 | 0.006 | 0.15 | 0.37 | 0.02 | 0.01 | 0.07 | 0.14 | 5.0 | 0.006 | 0.0010 |
| Invention | 10 | 0.007 | 0.25 | 0.41 | 0.01 | 0.01 | 0.04 | 0.13 | 5.2 | 0.005 | 0.0012 |
|  | 11 | 0.005 | 0.30 | 0.43 | 0.01 | 0.01 | 0.06 | 0.12 | 5.1 | 0.004 | 0.0010 |
|  | 12 | 0.008 | 0.21 | 0.88 | 0.02 | 0.02 | 0.07 | 0.13 | 5.5 | 0.008 | 0.0021 |
|  | 13 | 0.003 | 0.10 | 0.11 | 0.01 | 0.01 | 0.05 | 0.03 | 1.5 | 0.004 | 0.0010 |
|  | 14 | 0.004 | 0.10 | 0.07 | 0.01 | 0.01 | 0.05 | 0.04 | 1.5 | 0.004 | 0.0010 |
|  | 15 | 0.003 | 0.10 | 1.49 | 0.01 | 0.01 | 0.05 | 0.03 | 1.6 | 0.004 | 0.0011 |

TABLE 5-continued

|  | | | | | | | | | | | |
|---|---|---|---|---|---|---|---|---|---|---|---|
| | 16 | 0.003 | 0.25 | 0.38 | 0.01 | 0.01 | 0.06 | 0.07 | 1.1 | 0.003 | 0.0012 |
| | 17 | 0.002 | 0.15 | 0.42 | 0.01 | 0.01 | 0.04 | 0.12 | 1.0 | 0.003 | 0.0011 |
| | 18 | 0.005 | 0.13 | 0.34 | 0.01 | 0.01 | 0.03 | 0.16 | 1.4 | 0.004 | 0.0013 |
| | 1 | 0.003 | 0.04 | 0.25 | 0.01 | 0.01 | 0.04 | 0.05 | <0.01 | 0.004 | 0.0000 |
| | 2 | 0.004 | 0.05 | 0.20 | 0.01 | 0.01 | 0.06 | 0.00 | <0.01 | 0.004 | 0.0000 |
| Comparison | 3 | 0.004 | 0.08 | 0.60 | 0.01 | 0.01 | 0.06 | 0.12 | 5.0 | 0.002 | 0.0000 |
| | 4 | 0.003 | 0.10 | 1.25 | 0.01 | 0.01 | 0.05 | 0.15 | 10.0 | 0.002 | 0.0000 |

| | | Corrosion Resistance (weight loss $g/m^2$) | | | | | |
|---|---|---|---|---|---|---|---|
| | | Immersion Test | Outdoor Exposure Test | Coating Adhesion | Heat Resistance | Press Forming | Weld Strength |
| | 1 | 19.0 | 5.5 | 1 | ◎ | ◎ | ◎ |
| | 2 | 18.8 | 4.6 | 1 | ◎ | ◎ | ◎ |
| | 3 | 18.8 | 4.1 | 1 | ◎ | ◎ | ◎ |
| | 4 | 19.0 | 4.0 | 1 | ◎ | ◎ | ◎ |
| | 5 | 17.0 | 3.5 | 1 | ◎ | ◎ | ◎ |
| | 6 | 15.7 | 3.3 | 1 | ◎ | ◎ | ◎ |
| | 7 | 12.5 | 3.5 | 1 | ◎ | ◎ | ◎ |
| | 8 | 12.0 | 3.4 | 1 | ◎ | ◎ | ◎ |
| | 9 | 17.5 | 3.5 | 1 | ◎ | ◎ | ◎ |
| Present | 10 | 17.7 | 3.6 | 1 | ◎ | ◎ | ◎ |
| Invention | 11 | 18.1 | 3.4 | 1 | ◎ | ◎ | ◎ |
| | 12 | 16.8 | 3.4 | 1 | ◎ | ◎ | ◎ |
| | 13 | 19.5 | 5.7 | 1 | ◎ | ◎ | ◎ |
| | 14 | 19.4 | 5.4 | 1 | ◎ | ◎ | ◎ |
| | 15 | 19.8 | 6.0 | 1 | ◎ | ◎ | ◎ |
| | 16 | 20.1 | 6.1 | 1 | ◎ | ◎ | ◎ |
| | 17 | 19.6 | 5.9 | 1 | ◎ | ◎ | ◎ |
| | 18 | 19.5 | 5.6 | 1 | ◎ | ◎ | ◎ |
| | 1 | 39.8 | 13.0 | 1 | ◎ | ◎ | −2.1 |
| Comparison | 2 | 33.7 | 12.9 | 1 | X | ◎ | −1.9 |
| | 3 | 16.5 | 3.5 | 1 | ◎ | Δ | −1.0 |
| | 4 | 12.0 | 3.4 | 1 | ◎ | Δ | −1.2 |

EXAMPLE 4

11.8% Cr steel was cold rolled to 0.8 mm thick sheets, which were degreased and acid-pickled, and precoated by electroplating with nickel, Fe-Ni (Ni 99 to 1%) and Ni-Co (Co 1 to 30%) respectively in amounts ranging from 0.02 to 2 $g/m^2$ per one side. These pre-coated sheets were subjected to continuous hot-dip aluminum coating by a non-oxidizing furnace process. The properties of the aluminum coated sheets thus obtained are shown in Table 6. As understood from the table, the aluminum coatability and coating adhesion of the pre-coated sheets are as good as those obtainable by the comparative sheets, while the corrosion resistance and heat resistance of the pre-coated sheets are markedly better than those obtainable by the comparative sheets.

TABLE 6

| | Pre-Coating | | | | Corrosion Resistance | | Heat Resistance |
|---|---|---|---|---|---|---|---|
| | Coating Metal | Coating Amount | Coatability | Coating Adhesion | Weight Decrease | Appearance | |
| | Ni (100%) | 0.002 $g/m^2$ | ◎ | 1 | 3.0 | ◎ | ◎ |
| | | 0.5 | ◎ | 1 | 3.1 | ◎ | ◎ |
| | | 1 | ◎ | 1 | 3.5 | ◎ | ◎ |
| | | 2 | ◎ | 1 | 2.9 | ◎ | ◎ |
| | Fe—Ni(Ni 99%) | 0.002 | ◎ | 1 | 3.3 | ◎ | ◎ |
| | | 0.5 | ◎ | 1 | 3.5 | ◎ | ◎ |
| | | 1 | ◎ | 1 | 3.5 | ◎ | ◎ |
| | | 2 | ◎ | 1 | 4.0 | ◎ | ◎ |
| | Fe—Ni(Ni 50%) | 0.002 | ◎ | 1 | 3.5 | ◎ | ◎ |
| Present | | 0.5 | ◎ | 1 | 2.7 | ◎ | ◎ |
| Invention | | 1 | ◎ | 1 | 3.1 | ◎ | ◎ |
| | | 2 | ◎ | 1 | 4.2 | ◎ | ◎ |
| | Fe—Ni(Ni 1%) | 0.002 | ◎ | 1 | 3.1 | ◎ | ◎ |
| | | 0.5 | ◎ | 1 | 2.5 | ◎ | ◎ |
| | | 1 | ◎ | 1 | 3.1 | ◎ | ◎ |
| | | 2 | ◎ | 1 | 3.5 | ◎ | ◎ |
| | Ni—Co(Co 1%) | 0.002 | ◎ | 1 | 3.8 | ◎ | ◎ |
| | | 0.5 | ◎ | 1 | 3.5 | ◎ | ◎ |
| | | 1 | ◎ | 1 | 2.9 | ◎ | ◎ |
| | | 5 | ◎ | 1 | 3.0 | ◎ | ◎ |
| | Ni—Co(Co 30%) | 0.002 | ◎ | 1 | 3.5 | ◎ | ◎ |
| | | 0.5 | ◎ | 1 | 4.0 | ◎ | ◎ |
| | | 1 | ◎ | 1 | 4.0 | ◎ | ◎ |
| | | 5 | ◎ | 1 | 4.2 | ◎ | ◎ |
| | Comparison A | — | — | ◎ | 1 | 39.8 | X | ◎ |
| | (Conventional) B | — | — | ◎ | 1 | 33.7 | X | X |

TABLE 6-continued

| | Substrate Steel Composition | | | | | | | | |
|---|---|---|---|---|---|---|---|---|---|
| | C | Si | Mn | P | S | Al | Ti | Cv | N |
| Present Invention | 0.003 | 0.06 | 0.82 | 0.01 | 0.01 | 0.08 | 0.14 | 11.8 | 0.002 |
| Conventional A | 0.003 | 0.04 | 0.25 | 0.01 | 0.01 | 0.04 | 0.05 | <0.01 | 0.003 |
| Conventional B | 0.04 | 0.05 | 0.20 | 0.01 | 0.01 | 0.06 | 0.00 | <0.10 | 0.004 |

Hot-Dip Al Coating: Non-Oxidizing Furnace Process
Coating Bath: Al—10% Si (Bath Temperature 650° C.)
Coating Amount: 30 g/m²

EXAMPLE 5

Cold rolled steel sheets having compositions shown in Table 7, after degreasing and acid-pickling, were coated with nickel, Fe-Ni-Cr alloy, and Fe-Ni alloy respectively and subjected to thermal diffusion treatments on the hot-dip aluminum coating line by a non-oxidizing furnace process to form a Fe-Ni-Cr diffusion layer and then immersed in a hot-dip aluminum coating bath (Al-10% Si, 650° C.) to give aluminum coating.

The properties of the aluminum coated sheets thus obtained are shown in Table 8. As shown, the aluminum coated sheets according to the present invention show very excellent corrosion resistance and heat resistance with much less non-coating and pin-holes as compared with the comparative sheets.

TABLE 7

| | Substrate Steel Composition | | | | | | | Intermediate Alloy Layer | | |
|---|---|---|---|---|---|---|---|---|---|---|
| | C | Si | Mn | P | S | Acid-Soluble Al | Other Elements | Alloy Diffusion Layer | between the Substrate Surface and the Al Coating | Al Coating |
| Example 1 | 0.06 | 0.06 | 0.23 | 0.016 | 0.018 | 0.08 | — | — | Al—Si—Fe—3% Ni—1% Cr 5.5μ | Al—10% Si 10μ |
| Comparison 1 | " | " | " | " | " | " | — | — | Al—Si—Fe 5.5μ | " |
| Example 2 | 0.004 | 0.10 | 0.19 | 0.013 | 0.015 | 0.05 | Ti; 0.15% Nb; 0.005% | Ni—Fe (average Ni 28%; Cr 10%) 0.8μ | Al—Si—Fe—5.5% Ni—2% Cr 3.2μ | Al—8.5% Si 15μ |
| Comparison 2 | " | " | " | " | " | " | " | — | Al—Si—Fe 3.5μ | " |
| Example 3-1 | 0.06 | 0.15 | 0.33 | 0.02 | 0.011 | 0.04 | Cr; 5% Ni; 0.5% | Ni—Fe (average Ni 15%; Cr 4.1%) 0.8μ | Al—Si—Fe—7.5% Ni—3.5% Cr 4.1μ | Al—9.5% Si 18μ |
| Example 3-2 | " | " | " | " | " | " | " | — | " | " |
| Comparison 3 | " | " | " | " | " | " | " | — | Al—Si—Fe 4μ | " |
| Example 4 | 0.003 | 0.12 | 0.16 | 0.012 | 0.008 | 0.03 | Ti; 0.15% Cr; 3% Ni; 1% | — | Al—Si—Fe—15% Ni—5% Cr 2.5μ | Al—8% Si—1% Mg 20μ |
| Comparison 4-1 | " | " | " | " | " | " | " | — | Same as Example 4 but 12μ | Al—8% Si—1% Mg 10μ |
| Comparison 4-2 | " | " | " | " | " | " | " | — | Al—Si—Fe 2.8μ | Same as Example 4 |
| Example 5 | 0.006 | 0.36 | 0.60 | 0.015 | 0.016 | 0.06 | Ti; 0.18% Cr; 5.8% Ni; 2% | Ni—Fe (average Ni 10%; Cr 5.3%) 1.3μ | Al—Si—Fe—10% Ni—4% Cr 3.6μ | Al-7.5% Si 17μ |
| Comparison 5-1 | " | " | " | " | " | " | " | Ni—Fe (average Ni 80%) 3.5μ | " | " |
| Comparison 5-2 | " | " | " | " | " | " | " | — | Al—Si—Fe 3.6μ | " |

TABLE 8

| | Occurrence of Pin Holes in Alloy Layer | Evaluation of Corrosion Tests | | Evaluation of Heat Resistance | | Evaluation of Workability | |
|---|---|---|---|---|---|---|---|
| | | Salt Spray Test | Immersion Test | After Heating at 650° C. | After Heating at 775° C. | By Cup Drawing | By Flattening Tubular Product |
| Example 1 | ◎ | ◎ | ○ | ◎ | ○ | ○ | ○ |
| Comparison 1 | ○ | × | × | × | × | ○ | ○ |
| Example 2 | ◎ | ◎ | ◎ | ◎ | ◎ | ◎ | ◎ |
| Comparison 2 | △ | × | △~× | ○ | △ | ◎ | ◎ |
| Example 3-1 | ◎ | ◎ | ◎ | ◎ | ◎ | ◎ | ○ |
| Example 3-2 | ◎ | ◎ | ◎~○ | ◎ | ◎~○ | ◎ | ○ |
| Comparison 3 | × | × | × | × | × | ◎ | ○ |
| Example 4 | ◎ | ◎ | ◎~○ | ◎ | ◎ | ◎ | ◎ |
| Comparison 4-1 | ◎ | ◎ | ◎ | ◎ | ◎ | × | × |
| Comparison 4-2 | × | × | × | × | × | ◎ | ○~△ |
| Example 5 | ◎ | ◎ | ◎ | ◎ | ◎ | ○ | ○ |
| Comparison 5-1 | ◎ | ◎ | ◎ | ◎ | ◎ | × | × |
| Comparison 5-2 | × | × | × | × | × | ○ | ○ |

EXAMPLE 6

0.8 mm thick cold rolled steel sheets having the compositions shown in Table 9 were given various levels of surface roughnesses and subjected to a continuous hot-dip aluminum coating in a bath of AL-10%Si at 650° C.

by a non-oxidizing furnace process to give 80 g/m² aluminum coating. The investigations on the coating condition and corrosion resistance revealed that the aluminum coated sheets according to the present invention, particularly when the surface roughness is not more than Hmax 3μ, give excellent properties as shown in Table 10.

TABLE 9

| C | Si | Mn | P | S | Al | Ti | Cr | N |
|---|---|---|---|---|---|---|---|---|
| 0.005 | 0.06 | 0.30 | 0.01 | 0.01 | 0.04 | 0.14 | 5.2 | 0.004 |

TABLE 10

| Surface Roughness Hmax (μm) | Number of Bare Spots (Number/dm²) | Corrosion Resistance (Weight loss by corrosion g/m²) | Surface Appearance after Corrosion Test |
|---|---|---|---|
| 1 | 1.0 | 14.5 | ⬤ |
| 1.5 | 0.9 | 14.0 | ○ |
| 3 | 5.0 | 18.6 | ○ |
| 4 | 15.5 | 25.8 | X |
| 6 | 52.5 | 41.5 | X |

Evaluation of various properties of the aluminum coated sheets is made according to the following tests and criteria.

1. Evaluation of pin-holes in the alloy layer

The aluminum layer of the aluminum coated steel sheet is immersed in 20% NaOH solution at 80° C. for 5 minutes, and after the stripping off of the layer, the surface of the layer is observed to evaluate the occurrence of the pin-holes.

The criteria of evaluation are as below.
⬤: Number of pin-holes less than 10/dm²
○: Number of pin-holes 10/dm² to less than 30/dm²
Δ: Number of pin-holes 30/dm² to less than 100/dm²
X: Number of pin-holes 100/dm² or more 2. Evaluation of corrosion resistance (A) Salt spray test The ocurrence of red rust after 1000 hours of salt spray is observed and the evaluation is made according to the criteria below.
⬤: Occurrence of red rust less than 3%
○: Occurrence of red rust 3% to less than 10%
Δ: Occurrence of red rust 10% to less than 30%
X: Occurrence of red rust 30% or more (B) Solution immersion test Corrosion test is conducted with a half of the test piece immersed in an aqueous solution of lg/l (NH₄)₂SO₄—1.5 g/l (NH₄)NO₃—0.5 g/l NH₄Cl and the other half exposed to the vapor gas of the solution in a sealed vessel at 80° C. for 30 days, and evaluation is made according to the criteria below.
⬤: Weight loss less than 10 g/m² (appearance is good)
○: Weight loss 11-20 g/m² (partially corroded)
Δ: Weight loss 21-35 g/m² (remarkable corrosion)
X: Weight loss 36 g/m² or more (whole surface corrosion)

3. Evaluation of heat resistance (A) Heating test at 650° C.

Continuous heating in air at 650° C. for 1000 hours.

(B) Heating test at 775° C.

Five cycles of heating in air at 775° C. for 48 hours and cooling in air and evaluation is made according to the criteria below.
⬤: No surface scale
○: Very few dotted scale
Δ: Much dotted scale
X: Very much dotted scale 4. Evaluation of workability (A) Cup drawing test

| (1) Drawing condition | |
|---|---|
| Blank size | 150 φ |
| Punch diameter | 75 φ |
| Blank holding force | 1 ton |
| Lubricant | Machine oil #620 |

For the limit drawing ratio, the maximum blank size is sought which can be worked without fracture among various blank sizes.

| (2) Evaluation | |
|---|---|
| ⬤: Good | d/D ≧ 2.2 |
| ○: Fine cracking in the coating layer | |
| Δ: Dot-like peeling-off of the coating layer 1-2 points | d/D = 2.2–2.0 |
| X: Remarkable peeling-off of the coating layer | d/D < 2.0 |

(B) Workability test of pipes

| (1) Testing method | |
|---|---|
| Pipe size: | outer diameter 42.7 mm φ thickness 1.6 mm |
| 90° flattening Working degree: | Closely contacted |

(2) Evaluation

⬤: Good
○: Fine cracking in the coating layer
Δ: Large cracking in the coating layer
X: Partial peeling-off of the coating layer 5. Coating adhesion A reverse bending test, including bending, bending back and reverse bending, is performed.

Evaluation

1. No abnormality
2. Cracking in the coating layer
3. Partial peeling-off of the coating layer
4. Large peeling-off of the coating layer
5. Whole surface peeling-off of the coating layer 6. Strength of welded portions The aluminum coated sheets are welded by MIG welding, and tensile tests are conducted with test pieces according to JIS No. 5 test piece with tension applied at the right angle to the weld bead. Evaluation made on the basis of the lowering of the strength relative to the strength of the base steel.

What is claimed is:

1. A hot-dip aluminum coated steel sheet having excellent corrosion resistance and heat resistance, comprising a steel substrate consisting essentially of 3 to 18% chromium, not more than 0.02% carbon, 0.1 to 1.5% manganese, 0.005 to 0.08% aluminum, not more than 0.1% silicon, and 0.005 to 0.003% B with the balance being iron and unavoidable impurities, and an aluminum coating on said sheet substrate.

2. The hot-dip aluminum coated steel sheet according to claim 1, wherein the substrate further contains at least one of titanium, zirconium, and vanadium in an amount ranging from 0.03 to 0.16%.

3. The hot-dip aluminum coated steel sheet according to claim 1, wherein said substrate further contains at least one of titanium, zirconium, and vanadium in an amount ranging from 0.03 to 0.16%, and 0.0005 to 0.003% boron.

4. The hot-dip aluminum coated steel sheet according to any of claims 1 to 3, which further comprises a coating layer of nickel or nickel-iron alloy (Ni: 1 to 99%) beneath the aluminum coating.

5. The hot-dip aluminum coated steel sheet according to claims 2 to 3, in which the substrate has a surface roughness of not more than $3\mu$ in Hmax.

6. The hot-dip aluminum coated steel sheet according to claim 4, in which the substrate has a surface roughness of not more than $3\mu$ in Hmax.

7. The hot-dip aluminum coated steel sheet according to claim 4, which further comprises an Al-Fe-Si-Ni-Cr alloy coating layer of 1 to $10\mu$ in thickness and containing 0.05 to 5% nickel, 0.2 to 10% chromium, beneath the aluminum coating.

8. The hot dip aluminum coated steel sheet according to claim 7, which further comprises an Ni-Fe-Cr alloy having a diffusion layer of not more than $2\mu$ in thickness formed between the steel substrate and the Al-Fe-Si-Ni-Cr alloy coating layer and having an average nickel concentration of less than 50%, and an average chromium concentration of 1 to 15%.

9. A steel substrate for hot-dip aluminum which comprises 3 to 18% chromium, not more than 0.02% carbon, 0.1 to 1.5% manganese, 0.005 to 0.08% aluminum, not more than 0.1% silicon, at least one of titanium, zirconium, and vanadium in an amount ranging from 0.03 to 0.16%, 0.0005 to 0.003% boron, with the balance being iron and unavoidable impurities.

10. A steel sheet substrate for hot-dip aluminum which comprises 3 to 18% chromium, not more than 0.02% carbon, 0.1 to 1.5% manganese, 0.005 to 0.08% aluminum, not more than 0.1% silicon, with the balance being iron and unavoidable impurities and further comprising a coating layer of nickel or nickel-iron (Ni: 1 to 99%).

11. 11. A steel sheet substrate for hot-dip aluminum which comprises 3 to 18% chromium, not more than 0.02% carbon, 0.1 to 1.5% manganese, 0.005 to 0.08% aluminum, not more than 0.1% silicon, 0.003% B with the balance being iron and unavoidable impurities, in which the substrate has a surface roughness of not more than $3\mu$ in Hmax.

* * * * *